United States Patent
Tullberg et al.

(10) Patent No.: US 11,496,351 B2
(45) Date of Patent: Nov. 8, 2022

(54) MODULATING AND DEMODULATING DATA

(71) Applicant: Telefonaktiebolaget LM Ericsson (publ), Stockholm (SE)

(72) Inventors: Hugo Tullberg, Nyköping (SE); Göran N. Klang, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/270,068

(22) PCT Filed: Aug. 23, 2018

(86) PCT No.: PCT/SE2018/050851
§ 371 (c)(1),
(2) Date: Feb. 22, 2021

(87) PCT Pub. No.: WO2020/040674
PCT Pub. Date: Feb. 27, 2020

(65) Prior Publication Data
US 2021/0288862 A1  Sep. 16, 2021

(51) Int. Cl.
*H04L 27/34* (2006.01)
*H04L 27/36* (2006.01)
*H04L 27/38* (2006.01)

(52) U.S. Cl.
CPC .......... *H04L 27/3411* (2013.01); *H04L 27/36* (2013.01); *H04L 27/38* (2013.01)

(58) Field of Classification Search
CPC ... H04L 27/3411; H04L 1/00; H04L 27/3483; H04L 27/345; H04L 27/3488; H04L 27/183; H04L 27/2604; H04L 27/36; H04L 27/38; H04L 27/3416; H04B 10/516

See application file for complete search history.

(56) References Cited

U.S. PATENT DOCUMENTS

| | | | |
|---|---|---|---|
| 8,085,865 B2* | 12/2011 | Zehavi | H04W 28/18 375/295 |
| 2002/0131524 A1 | 9/2002 | Demjanenko et al. | |
| 2006/0159120 A1* | 7/2006 | Kim | H04L 1/0009 370/465 |
| 2013/0127558 A1* | 5/2013 | Clevorn | H04L 27/3411 332/183 |

(Continued)

OTHER PUBLICATIONS

Clevorn "Simple Peak-to-Average Power Ratio Reduction by Non-Regular Signal Constellation Sets", Sep. 2012, 2012 IEEE 23rd International Symposium on Personal, Indoor and Mobile Radio Communications—(PIMRC), pp. 1-6. (Year: 2012).*

(Continued)

*Primary Examiner* — Sophia Vlahos
(74) *Attorney, Agent, or Firm* — Murphy, Bilak & Homiller, PLLC

(57) ABSTRACT

It is presented a method for modulating data for transmission over a communication channel to a receiver network entity. The method is performed in a transmitter network entity and comprises the step of: modulating data in accordance with a modulation scheme, the modulation scheme comprising a first set of constellation points respectively representing only one bit sequence and a second set of constellation points respectively representing two different bit sequences.

14 Claims, 9 Drawing Sheets

(56) References Cited

U.S. PATENT DOCUMENTS

2014/0079162 A1 3/2014 Mansour et al.
2014/0269861 A1* 9/2014 Eliaz ................ H04L 25/03834
  375/219

OTHER PUBLICATIONS

Böcherer, Georg, "Labeling Non-Square QAM Constellations for One-Dimensional Bit-Metric Decoding", IEEE Communications Letters, vol. 18, Issue 9, Sep. 2014, 4 pages.
Böcherer, Georg, et al., "Bandwidth Efficient and Rate-Matched Low-Density Parity-Check Coded Modulation", IEEE Transactions on Communications, vol. 63, No. 12, Dec. 2015, 4651-4665.
Böcherer, Georg, "Capacity-Achieving Probabilistic Shaping for Noisy and Noiseless Channels", Dissertation for Rheinisch-Westfälischen Technischen Hochschule Aachen, Feb. 13, 2012, 1-145.
Buchali, F., et al., "Experimental Demonstration of Capacity Increase and Rate-Adaptation by Probabilistically Shaped 64-QAM", IEEE 2015 European Conference on Optical Communication, Valencia, Spain, Sep. 27-Oct. 1, 2015, 1-3.
Nadal, Florence, et al., "Peak-to-Average Power Ratio Reduction in CDMA Systems Using Constellation Extension", 2005 IEEE 16th International Symposium on Personal, Indoor and Mobile Radio Communications, Berlin, Germany, Sep. 11-14, 2005, 417-420.
Sun, Peng, "Transmitting with Fewer Constellation Points", The 2011 Military Communications Conference, Track 1, Waveforms and Signal Processing, Baltimore, MD, USA, Nov. 7-10, 2011, 600-604.

* cited by examiner

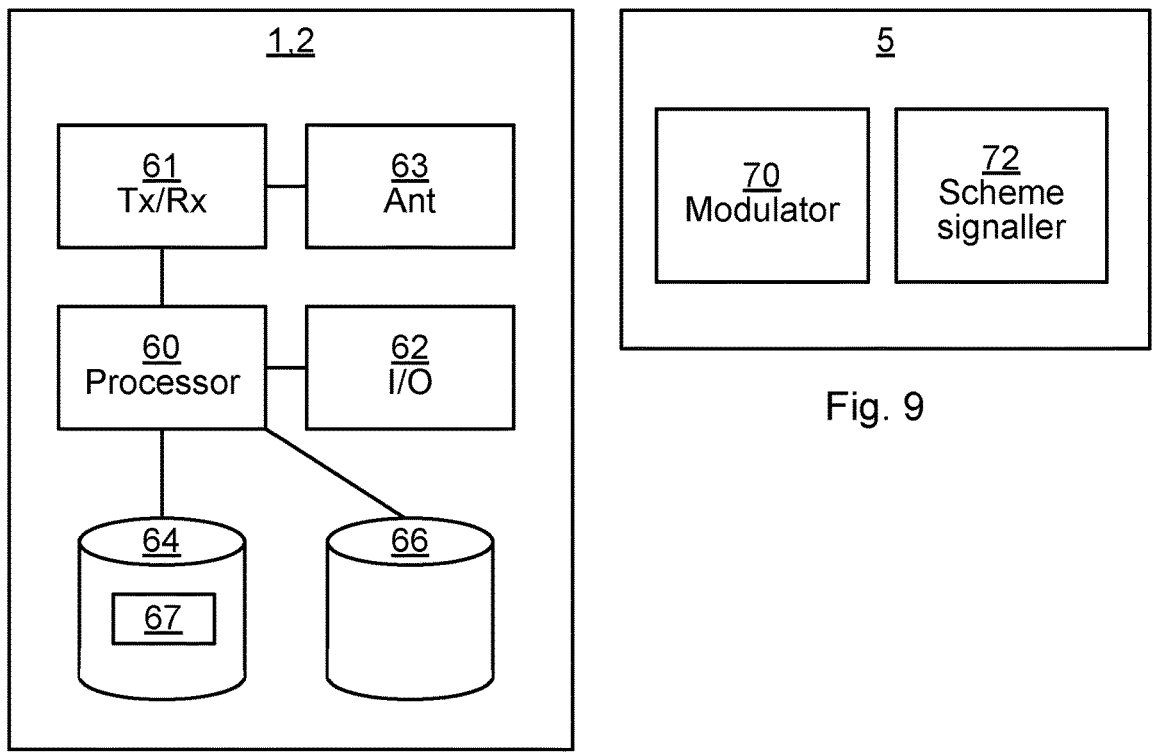
Fig. 8
Fig. 9
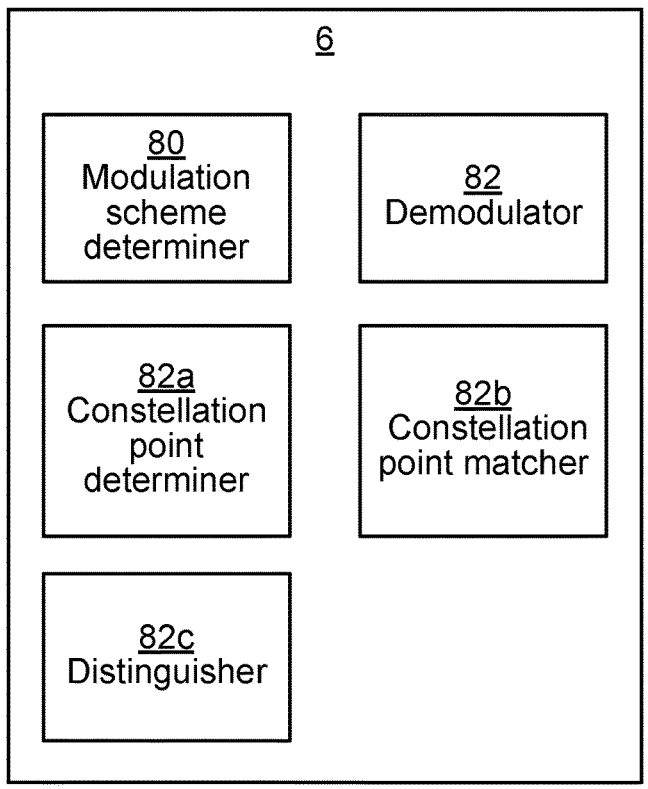
Fig. 10
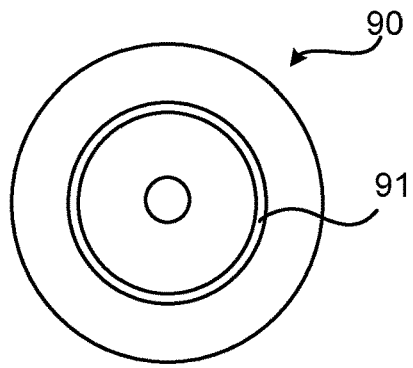
Fig. 11

MODULATING AND DEMODULATING DATA

TECHNICAL FIELD

The invention relates to methods, network entities, computer programs and computer program products for modulating and demodulating data transmitted over a communication channel.

BACKGROUND

Modulating data for transmission over a communication channel can be done using many different modulation schemes. One commonly used modulation scheme is QAM (Quadrature Amplification Modulation). In QAM, a number of constellation points are specified in a plane defined by a magnitude in an in-phase carrier (on the x axis) and a magnitude in a quadrature carrier (on the y axis). Each constellation point corresponds to a symbol transmitted over the communication channel and represents a bit sequence. The constellation points are often provided in a rectangular, e.g. square, pattern. Examples of known such schemes are 16-QAM containing 4×4 constellation points, 64-QAM containing 8×8 constellation points and 256-QAM containing 16×16 constellation points. There are many other QAM modulation schemes.

While rectangular QAM has proved valuable and gained popularity, rectangular QAM suffers from relatively poor Peak-to-Average Power Ratio (PAPR) due i.a. to the corner points of the rectangular QAM.

The article by Georg Böcherer "Labeling Non-Square QAM Constellations for One-Dimensional Bit-Metric Decoding", IEEE Communications Letters, Volume: 18, Issue: 9, September 2014, presents a modulation scheme that combines the features of APSK and QAM constellations, namely, low peak power of APSK and the independent processing of the real and imaginary components of QAM. In this article, it is disclosed a method which starts from a $2^{(2m)}$ constellation and removes the $2^{(2m-1)}$ constellation points with highest energy. E.g., it is started with a 64 QAM and high energy points are removed to get a more round constellation with 32 points. The final constellation should be symmetric around the origin.

By this process, the final constellation can convey $\log_2(32)=5$ bits per channel use with a 2-dimensional constellation, equaling 2.5 bits per dimension per channel use. The method proposes a label that still uses 6 digits in the label to get independence in I and Q component (equal to X and Y axes in the constellation diagram).

The method thus conveys 5 bits per channel use (2.5 bits per dimension per channel use), and uses a 6-digit label, whereby a mapping is needed to map the 5 bits to the 6-digit label. Firstly, this requires extra processing at both the transmitter and receiver. Secondly, this introduces a dependence between the bit levels.

The label bits are not equally distributed in terms of probability and that may affect the performance (or at least make the Log Likelihood Ratio (LLR) computation less symmetric). Moreover, the presented method is complicated.

SUMMARY

It is an object to provide a modulation scheme which provides better, i.e. lower, PAPR than rectangular QAM and that is easier to implement than methods known in the prior art.

According to a first aspect, it is presented a method for modulating data for transmission over a communication channel to a receiver network entity. The method is performed in a transmitter network entity and comprises the step of: modulating data in accordance with a modulation scheme, the modulation scheme comprising a first set of constellation points respectively representing only one bit sequence and a second set of constellation points respectively representing two different bit sequences.

When all of the constellation points of the modulation scheme are plotted on a constellation diagram, the constellation points may resemble a rectangle with removed corners.

In one embodiment, there is one corner point missing for each corner, in the constellation diagram, to make complete rectangle.

In one embodiment, there are three corner points missing for each corner, in the constellation diagram, to make complete rectangle.

Each constellation point in the first set may represent the same bit sequence as for a corresponding constellation point of a square Quadrature Amplitude Modulation, QAM, scheme.

For each constellation point in the second set, a first bit sequence may be the same bit sequence as for the corresponding square QAM scheme and a second bit sequence may represent a constellation point of the square QAM scheme which is not present in the modulation scheme.

In one embodiment, for each constellation point in the second set, the first bit sequence and the second bit sequence only differs by one bit.

In one embodiment, for each constellation point in the second set, the first bit sequence is the inverse of the second bit sequence.

The method may further comprise the step of: signalling to the receiver network entity the modulation scheme being used.

The method may further comprise the step of: determining the modulation scheme to be used, which comprises receiving a signal indicating the modulation scheme to use.

The transmission may be an uplink transmission.

In one embodiment, a method for modulating data for transmission over a communication channel to a receiver network entity is provided. The method is performed in a transmitter network entity and comprises the step of:

modulating data in accordance with a modulation scheme, the modulation scheme comprising a first set of constellation points respectively representing only one bit sequence and a second set of constellation points respectively representing two different bit sequences, wherein the two different bit sequences are a first bit sequence and a second bit sequence, the first bit sequence and the second bit sequence only differs by one bit, or the first bit sequence is the inverse of the second bit sequence.

According to a second aspect, it is presented a transmitter network entity for modulating data for transmission over a communication channel to a receiver network entity. The transmitter network entity comprises: a processor; and a memory storing instructions that, when executed by the processor, cause the transmitter network entity to: modulate data in accordance with a modulation scheme, the modulation scheme comprising a first set of constellation points respectively representing only one bit sequence and a second set of constellation points respectively representing two different bit sequences.

When all of the constellation points of the modulation scheme are plotted on a constellation diagram, the constellation points may resemble a rectangle with removed corners.

In one embodiments, there is one corner point missing for each corner, in the constellation diagram, to make complete rectangle.

In one embodiment, there are three corner points missing for each corner, in the constellation diagram, to make complete rectangle.

Each constellation point in the first set may represent the same bit sequence as for a corresponding constellation point of a square Quadrature Amplitude Modulation, QAM, scheme.

For each constellation point in the second set, a first bit sequence may be the same bit sequence as for the corresponding square QAM scheme and a second bit sequence may represent a constellation point of the square QAM scheme which is not present in the modulation scheme.

In one embodiment, for each constellation point in the second set, the first bit sequence and the second bit sequence only differ by one bit.

In one embodiment, for each constellation point in the second set, the first bit sequence is the inverse of the second bit sequence.

The transmitter network entity may further comprise instructions that, when executed by the processor, cause the transmitter network entity to signal to the receiver network entity the modulation scheme being used.

The transmitter network entity may further comprise instructions that, when executed by the processor, cause the transmitter network entity to determine the modulation scheme to be used, which comprises to receive a signal indicating the modulation scheme to use.

The transmission may be an uplink transmission.

According to a third aspect, it is presented a transmitter network entity comprising: means for modulating data in accordance with a modulation scheme for transmission over a communication channel to a receiver network entity, wherein the modulation scheme comprises a first set of constellation points respectively representing only one bit sequence and a second set of constellation points respectively representing two different bit sequences.

According to a fourth aspect, it is presented a computer program for modulating data for transmission over a communication channel to a receiver network entity. The computer program comprises computer program code which, when run on a transmitter network entity causes the transmitter network entity to: modulate data in accordance with a modulation scheme, the modulation scheme comprising a first set of constellation points respectively representing only one bit sequence and a second set of constellation points respectively representing two different bit sequences.

According to a fifth aspect, it is presented a computer program product comprising a computer program according to the fourth aspect and a computer readable means on which the computer program is stored.

According to a sixth aspect, it is presented a method for demodulating signals received over a communication channel from a transmitter network entity. The method is performed in a receiver network entity and comprises the steps of: determining a modulation scheme used by the transmitter network entity, wherein the modulation scheme comprises a first set of constellation points respectively representing only one bit sequence and a second set of constellation points respectively representing two different bit sequences; and demodulating received signals in accordance with the modulation scheme.

The step of demodulating received signals may comprise the steps of: determining the constellation points in the second set; determining when a received symbol is considered to match a constellation point in the second set, yielding an ambiguous symbol; and distinguishing between the multiple bit sequences of an ambiguous symbol using forward error correction, FEC.

The step of determining a modulation scheme may comprise receiving a signal indicating the modulation scheme being used.

The signals may be received in an uplink reception.

According to a seventh aspect, it is presented a receiver network entity for demodulating signals received over a communication channel from a transmitter network entity. The receiver network entity comprises: a processor; and a memory storing instructions that, when executed by the processor, cause the receiver network entity to: determine a modulation scheme used by the transmitter network entity, wherein the modulation scheme comprises a first set of constellation points respectively representing only one bit sequence and a second set of constellation points respectively representing two different bit sequences; and demodulate received signals in accordance with the modulation scheme.

The instructions to demodulate received signals may comprise instructions that, when executed by the processor, cause the receiver network entity to: determine the constellation points in the second set; determine when a received symbol is considered to match a constellation point in the second set, yielding an ambiguous symbol; and distinguish between the multiple bit sequences of an ambiguous symbol using forward error correction, FEC.

The instructions to determine a modulation scheme may comprise instructions that, when executed by the processor, cause the receiver network entity to receive a signal indicating the modulation scheme being used.

The signals may be received in an uplink reception.

According to an eighth aspect, it is presented a receiver network entity comprising: means for determining a modulation scheme used by the transmitter network entity for demodulating signals received over a communication channel from a transmitter network entity, wherein the modulation scheme comprises a first set of constellation points respectively representing only one bit sequence and a second set of constellation points respectively representing two different bit sequences; and means for demodulating received signals in accordance with the modulation scheme.

According to a ninth aspect, it is presented a computer program for demodulating signals received over a communication channel from a transmitter network entity. The computer program comprises computer program code which, when run on a receiver network entity causes the receiver network entity to: determine a modulation scheme used by the transmitter network entity, wherein the modulation scheme comprises a first set of constellation points respectively representing only one bit sequence and a second set of constellation points respectively representing two different bit sequences; and demodulate received signals in accordance with the modulation scheme.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 8 is a schematic diagram illustrating components of the base stations and the wireless device of FIG. 2;

FIG. 9 is a schematic diagram showing functional modules of the transmitter network entity of FIGS. 3A and 3B according to one embodiment;

FIG. 10 is a schematic diagram showing functional modules of the receiver network entity of FIGS. 3A and 3B according to one embodiment;

FIG. 11 shows one example of a computer program product comprising computer readable means;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
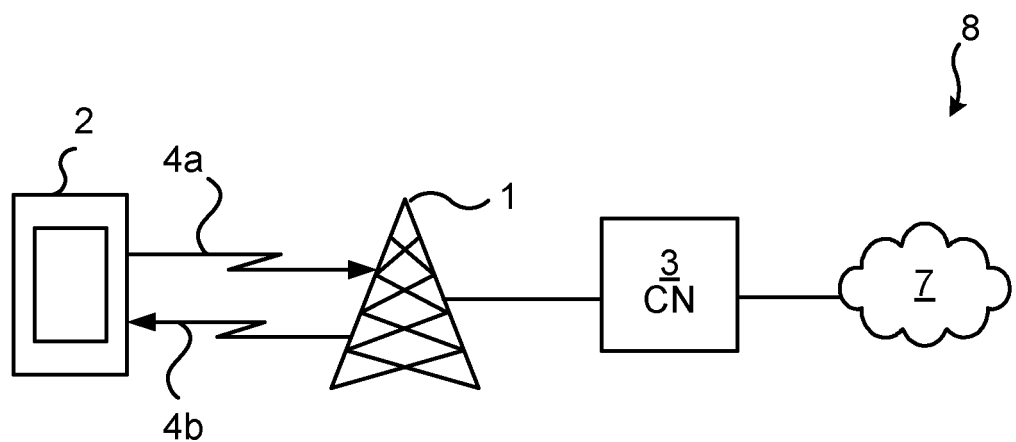
FIG. 1 is a schematic diagram illustrating a cellular communication network where embodiments presented herein may be applied.

FIG. 1 is a schematic diagram illustrating a cellular communication network 8 where embodiments presented herein may be applied. The cellular communication network 8 comprises a core network 3 and one or more base stations 1, here in the form of base stations being evolved Node Bs, also known as eNode Bs or eNBs. The base station 1 could also be in the form of g Node Bs, Node Bs, BTSs (Base Transceiver Stations) and/or BSSs (Base Station Subsystems), etc. The base station 1 can be implemented at one location or can be split over several locations. For instance, part of the processing of the base station 1 can be performed in a central location, also known as the cloud. In such a case, the processing in the central location can be performed in a physical device which performs processing for several base stations 1.

The base station 1 provides radio connectivity over a wireless interface 4a-b to a plurality of wireless devices 2. The term wireless device is also known as mobile communication terminal, user equipment (UE), mobile terminal, user terminal, user agent, wireless terminal, machine-to-machine device etc., and can be, for example, what today are commonly known as a mobile phone, smart phone, Internet of Things (IoT) device, or a tablet/laptop with wireless connectivity. The term wireless is here to be construed as having the ability to perform wireless communication. More specifically, the wireless device 2 can comprise a number of wires for internal and/or external purposes.

The cellular communication network 8 may e.g. comply with any one or a combination of 5G NR (New Radio), LTE (Long Term Evolution), LTE-Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Over the wireless interface, downlink (DL) communication 4b occurs from the base station 1 to the wireless device 2 and uplink (UL) communication 4a occurs from the wireless device 2 to the base station 1. The quality of the wireless radio interface for each wireless device 2 can vary over time and depends on the position of the wireless device 2, due to effects such as fading, multipath propagation, interference, etc.

The base station 1 is also connected to the core network 3 for connectivity to central functions and a wide area network 7, such as the Internet.

Figure 2A:
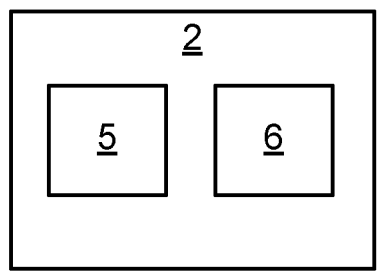
FIGS. 2A-B are schematic diagrams illustrating network entities forming part of the wireless device and the base station of FIG. 1.
Figure 2B:
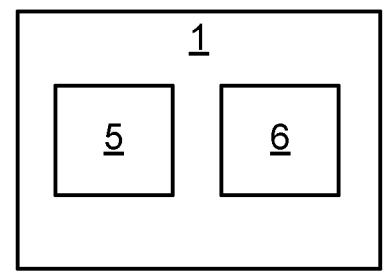

FIGS. 2A-B are schematic diagrams illustrating network entities forming part of the wireless device 2 and the base station 1 of FIG. 1.

As shown in FIG. 2A, the wireless device 2 comprises a transmitter network entity 5 as well as a receiver network entity 6. The transmitter network entity 5 is configured to perform modulation, power amplification and other processing for uplink transmissions to the base station 1. Analogously, the receiver network entity 6 is configured to perform demodulation and other processing for receiving downlink transmissions from the base station 1. The transmitter network entity 5 and the receiver network entity 6 do not need to, but can be, physically separate. In other words, physical components of the transmitter network entity 5 may also be used in the receiver network entity 6, when applicable.

Looking now to FIG. 2B, also the base station 1 comprises a transmitter network entity 5 and a receiver network entity 6. The transmitter network entity 5 is here configured to perform modulation, power amplification and other processing for downlink transmissions to the wireless device 2. Analogously, the receiver network entity 6 is configured to perform demodulation and other processing for receiving uplink transmissions from the wireless device 2. As for the wireless device, the transmitter network entity 5 and the receiver network entity 6 do not need to, but can be, physically separate. In other words, physical components of the transmitter network entity 5 may also be used in the receiver network entity 6, when applicable.

Figure 3:
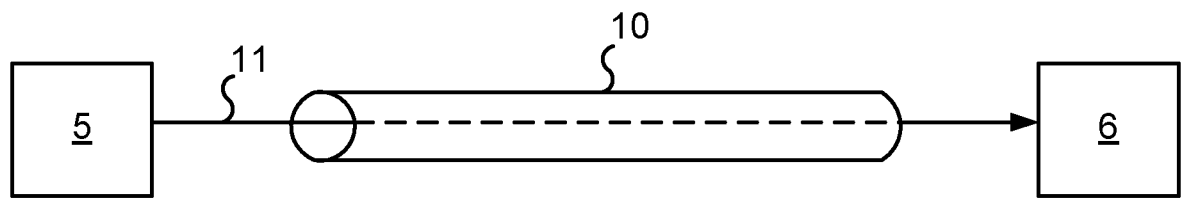
FIG. 3 is a schematic diagram illustrating a communication channel.

FIG. 3 is a schematic diagram illustrating a communication channel 10. Transmissions 11 from a transmitter network entity 5 pass are transported through a communication channel 10 to a receiver network entity 6. The communication channel 10 can comply with any suitable cellular network specification exemplified above. Alternatively, the communication channel 10 can be for another type of data transfer, e.g. a wired communication channel or a local wireless communication channel.

Figure 4A:
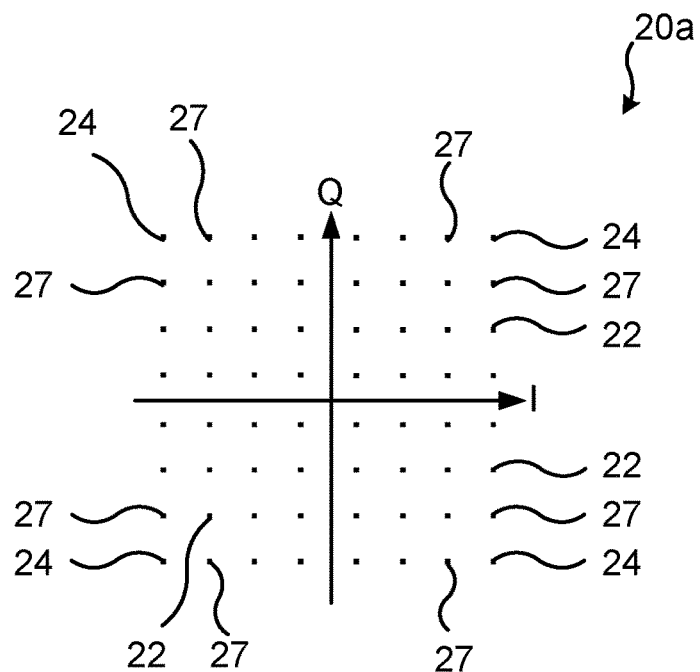
FIGS. 4A-B are constellation diagrams illustrating modulation schemes which can be used by the network entities of FIG. 1.
Figure 4B:
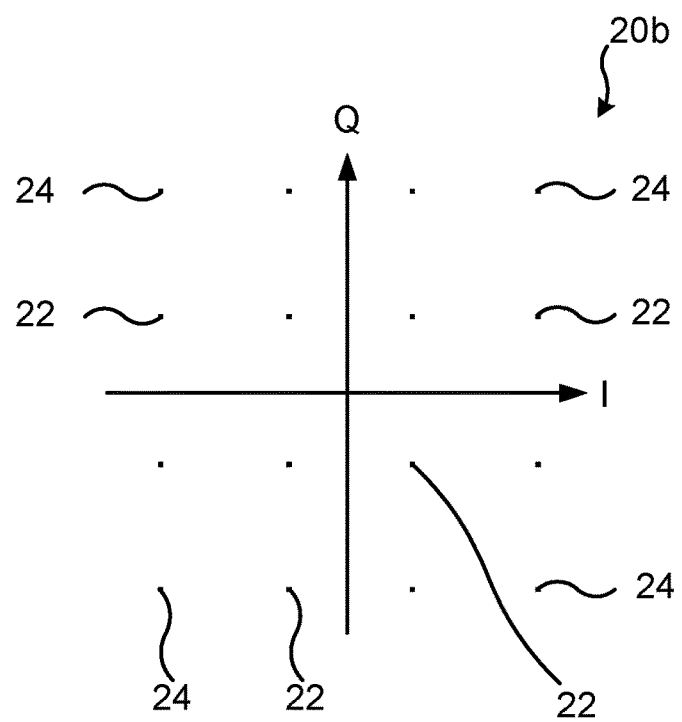

FIGS. 4A-B are constellation diagrams illustrating modulation schemes which can be used by the network entities of FIG. 1. The horizontal axis I represents in-phase carrier and the vertical axis Q represents quadrature carrier. This is often thought of as a complex number plane, with I being the real component and Q being the imaginary component.

Looking first to FIG. 4A, this shows a constellation diagram with 64 constellation points 22 equidistantly spaced in the IQ plane. The modulation illustrated by FIG. 4A is a 64-QAM (Quadrature Amplitude Modulation) modulation, so called due to there being 64 constellation points, each representing one of 64 (2^6) bit sequences. Each bit sequence is thus here 6 bits long. Each constellation point 22 is transmitted as a symbol from the transmitter to the receiver network entity. When the receiver network entity receives the symbol, it determines the corresponding constellation point 22 and determines the bit sequence represented by the determined constellation point. 64-QAM is a rectangular modulation scheme that is known in the art per se.

There are four corner points 24, being the constellation points furthest away from the origin. Moreover, there are two further constellation points 27 in each quadrant, being the two constellation points being closest to the respective corner point 27. Together, these three corner points 24, 27 are the three constellation points being furthest from the origin in each quadrant. As explained in further detail below, embodiments presented herein allow corner points (e.g. one for each corner or three for each corner) to be removed from the modulation scheme.

Looking now to FIG. 4B, this shows a constellation diagram with 16 constellation points 22 equidistantly spaced in the IQ plane, illustrating a 16-QAM modulation, which is known in the art per se.

Figure 5A:
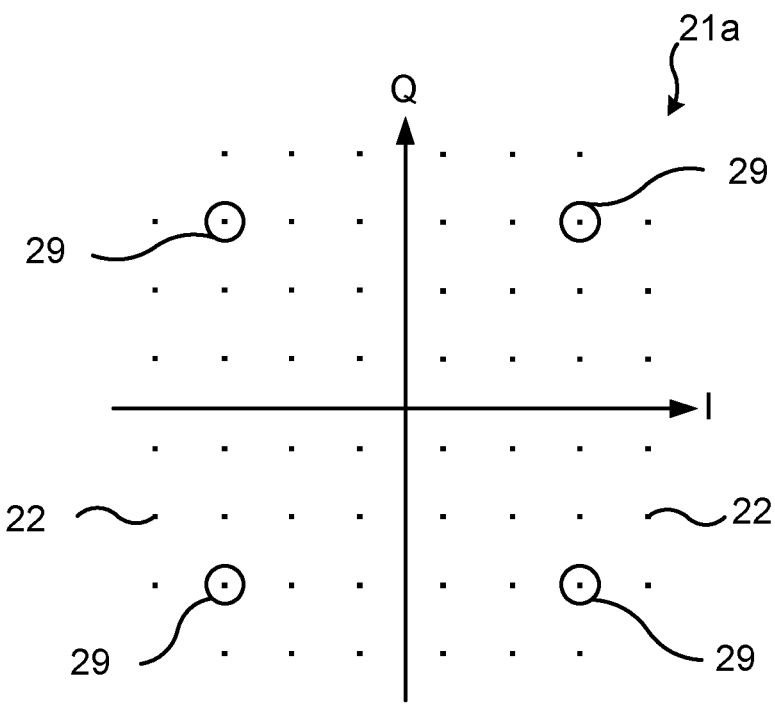
FIGS. 5A-B are constellation diagrams illustrating modulation schemes according to embodiments presented herein.
Figure 5B:
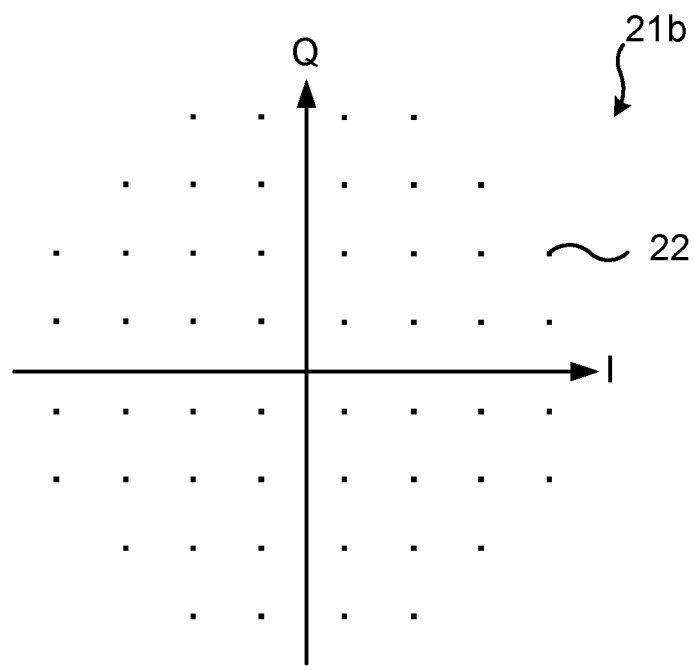

FIGS. 5A-B are constellation diagrams illustrating modulation schemes 21a-b according to embodiments presented herein.

Looking to FIG. 5A, the modulation scheme 21a of FIG. 5A is similar to 64-QAM. However, one corner point of each quadrant have been removed. Hence, there are here 60 constellation points. Still, we would like to represent 64 different bit sequences, representing six bits. This is solved by each one of the corner points to be represented by another one of the constellation points 29. Consequently, according to this modulation scheme 21a, there are overloaded constellation points 29, representing two different bit sequences. All the other constellation points, representing only one bit sequence are defined to form part of a first set of constellation points. The constellation points 29 representing two different bit sequences are defined to form a second set of constellation points. The overloaded constellation points 29 do not need to be located where exemplified in FIG. 5A; these overloaded constellation points can be located anywhere among the remaining constellation points 22 once the corner points are removed. However, the closer the overloaded constellation points are to the origin, the lower the average energy. Since the peak energy is given by the maximum energy of the remaining constellation points, the PAPR becomes larger (i.e. worse) if the average energy is reduced. Hence, the overloaded constellation points can be provided further out to minimise PAPR. On the other hand, the overloaded constellation points can be provided closer to the origin to lower average energy to thereby conserve power use. In other words, in one embodiment, the overloaded constellation points are placed furthest from the origin to reduce PAPR. In another embodiment, the overloaded constellation points are placed close to the origin to reduce power consumption. In another embodiment, the overloaded constellation points are placed somewhere in between to balance the two benefits.

On the receiver side, when a symbol of a constellation point 29 of the second set is received, this can represent one of two possible bit sequences. As explained in further detail below, the receiver network entity distinguishes between the two possible bit sequences using forward error correction, FEC, which is already provided in many communication channel protocols.

By not having the corner points in the modulation scheme, PAPR is reduced, which reduces the requirements on the transmitter. By using FEC on the receiver side, a simple modulation scheme is provided.

An advantage of embodiments presented herein is that no additional mapping between encoded bits and constellation labels are needed. At the transmitter, nothing needs to be done except in the constellation mapper (changing the label of the corner points/corner and edge points to interior points). At the receiver, the regular LLR computation circuitry can be used.

In the prior art by Böcherer presented background, there are a non-integer number of information bits per constellation dimension. This requires an additional mapper.

In embodiments presented herein, there is no need to keep track of which LLRs come from constellation points which may have been "overloaded" (used by two labels). In the set zero mode described more below, this amounts to setting the LLR for one bit in the label to 0. If the LLR is set to 0, this is effectively an erasure. An erasure is simpler to handle by the FEC than an error (if it is erased, it cannot mislead). For the methods where tentative decisions are made and updates are done later, this becomes more complex. However, e.g. for an IoT uplink, the additional complexity can be collected in the receiver in the base station, which is an advantage since the base station is not as constrained as an IoT device.

The modulation scheme can be used to reduce the amplitude of signals output by the power amplifier, thereby reducing requirements on linearity for high amplitude signals since the highest-power outputs are removed. Alternatively, the whole modulation scheme can be scaled up to the same maximum amplitude as for the equivalent QAM modulation scheme. This results in increased distance between constellation points, making the modulation scheme more robust compared to an equivalent QAM modulation scheme.

Looking now to FIG. 5B, this illustrates a modulation scheme 21b where three corner points have been removed for each corner. This augments the effect of reduced maximum amplitude or increased distance between constellation points.

While the modulation schemes shown in FIG. 5A and FIG. 5B are used for a constellation size supporting bit sequences of six bits (corresponding to 64QAM), the modulation scheme can be applied for any suitable constellation size. For instance, the modulation scheme can be applied in constellation size for bit sequences of four bits, eight bits, etc. The larger the constellation, the more rounded corners can be sculpted, improving circularity, and thereby performance, of the constellation.

While two-dimensional constellations are disclosed here, the same principle can be applied to higher-dimensional constellations, where corner points are removed to create a constellation closer to a sphere or hyper-sphere.

Figure 6A:
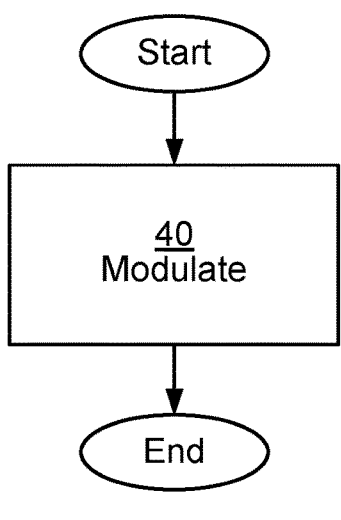
FIGS. 6A-C are flow charts illustrating methods for modulating data for transmission over a communication channel to a receiver network entity.
Figure 6B:
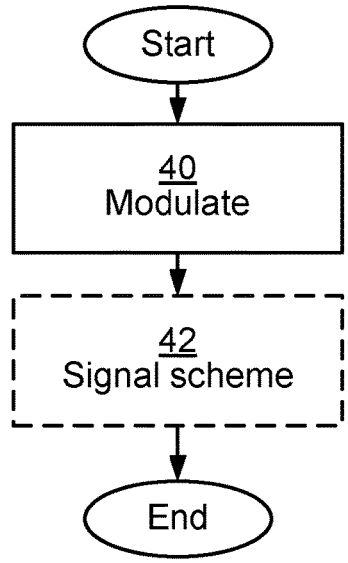
Figure 6C:
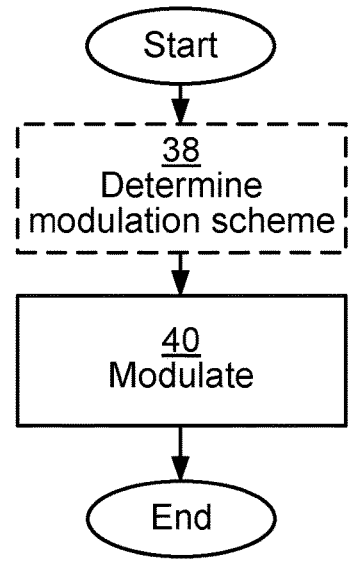

FIGS. 6A-C are flow charts illustrating methods for modulating data for transmission over a communication channel to a receiver network entity. The method is performed in a transmitter network entity. The method can be applied for uplink transmissions, where reduced amplitude of transmissions is particularly beneficial, since a wireless device is often limited in capacity and linearity in its power amplifiers. This is an issue which only increases with the increased popularity of Internet of Things (IoT) devices.

Nevertheless, the method can equally well be applied for downlink transmissions.

In a modulate step 40, the transmitter network entity determines a modulation scheme to be used. The modulation scheme comprises a first set of constellation points respectively representing only one bit sequence and a second set of constellation points (overloaded constellation points) respectively representing two different bit sequences. The transmitter network entity modulates data in accordance with the modulation scheme.

When all of the constellation points of the modulation scheme are plotted on a constellation diagram, the constellation points resemble a rectangle with removed corners, e.g. as seen in FIGS. 5A and 5B.

In one embodiment, there is one corner point missing for each corner, in the constellation diagram, to make complete rectangle, e.g. as shown in FIG. 5A.

In one embodiment, there are three corner points missing for each corner, in the constellation diagram, to make complete rectangle, e.g. as shown in FIG. 5B. The three missing corner points, in each quadrant, are the three constellation points with the greatest amplitude, i.e. distance from the origin.

The modulation scheme can be such that each constellation point in the first set represents the same bit sequence as for a corresponding constellation point of a square QAM scheme. This makes the modulation scheme similar to square QAM schemes (16-QAM, 64-QAM, 256-QAM, etc.), simplifying implementation.

In order to minimise differences with traditional QAM modulation, for each constellation point in the second set, a first bit sequence can be the same bit sequence as for the corresponding square QAM scheme. Furthermore, a second bit sequence represents a constellation point of the square QAM scheme which is not present in the modulation scheme, i.e. for corner points.

In one embodiment, for each constellation point in the second set, the first bit sequence and the second bit sequence only differ by one bit. This is also called a flip one mode.

In one embodiment, for each constellation point in the second set, the first bit sequence is the inverse of the second bit sequence. This is also called a flip all mode.

Looking now to FIG. 6B, only new or modified steps compared to the steps of FIG. 6A are described.

In an optional signal scheme step 42, transmitter network entity signals to the receiver network entity the modulation scheme being used. In this case, it is the transmitter network entity that is given the task of determining the modulation scheme to use.

Looking now to FIG. 6C, only new or modified steps compared to the steps of FIG. 6A are described.

In an optional determine modulation scheme step 38, the transmitter network entity determines the modulation scheme to be used (in step 40). This comprises receiving a signal indicating the modulation scheme to use. For instance, the receiver network entity might be given the task of determining the modulation scheme to use, in which case, it is the receiver network entity that sends this signal to the transmitter network entity.

Figure 7A:
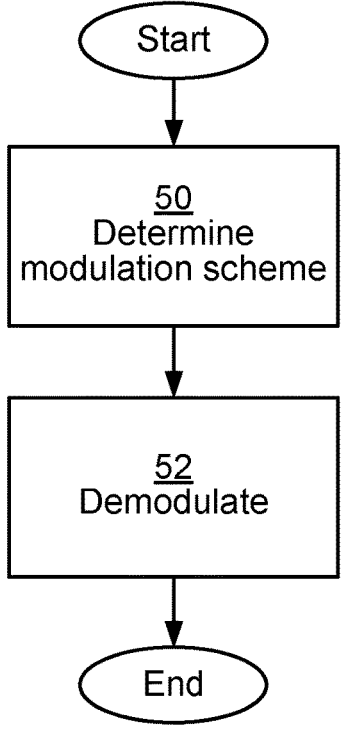
FIGS. 7A-B are flow charts illustrating methods for demodulating signals received over a communication channel from a transmitter network entity.
Figure 7B:
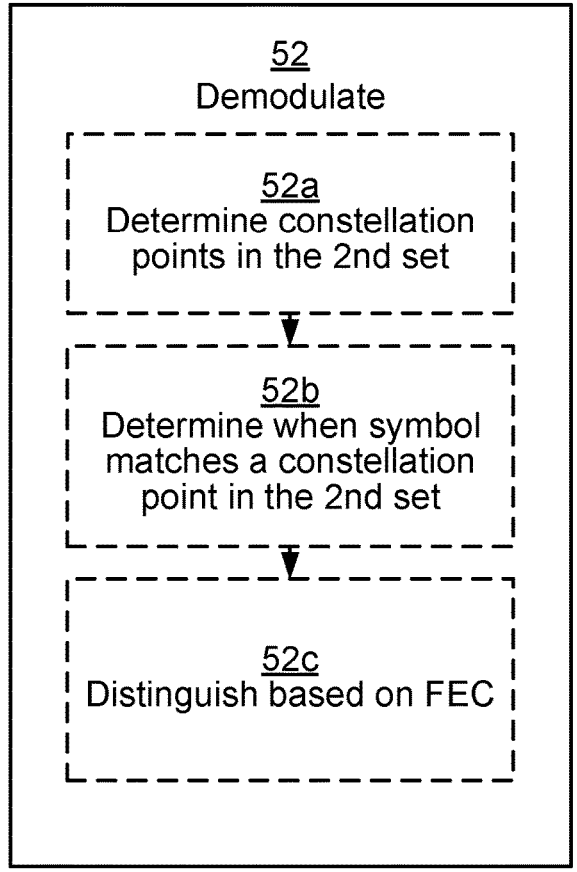

FIGS. 7A-B are flow charts illustrating methods for demodulating signals received over a communication channel from a transmitter network entity. The method is performed in a receiver network entity. As explained above, the method can be applied for uplink transmissions and/or downlink transmissions.

In a determine modulation scheme step 50, the receiver network entity determines a modulation scheme used by the transmitter network entity. As for the transmitter side, the modulation scheme comprises a first set of constellation points respectively representing only one bit sequence and a second set of constellation points respectively representing two different bit sequences.

Optionally, this comprises receiving a signal indicating the modulation scheme being used, e.g. from the transmitter network entity.

In a demodulate step 52, the receiver network entity demodulates received signals in accordance with the modulation scheme. The demodulation occurs using FEC.

Looking now to FIG. 7B, this is a flow chart illustrating optional substeps of the demodulate step 52 of FIG. 7A.

In an optional determine constellation points in the second set step 52a, the receiver network entity determines the constellation points in the second set.

In an optional determine when symbol matches a constellation point in the second set step 52b, the receiver network entity determines when a received symbol is considered to match a constellation point in the second set, yielding an ambiguous symbol.

In an optional distinguish based on FEC step 52c, the receiver network entity distinguishes between the multiple bit sequences of an ambiguous symbol using FEC.

FIG. 8 is a schematic diagram illustrating components of the base station 1 and the wireless device 2 of FIG. 2. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute any one of the methods described with reference to FIGS. 6A-C and FIGS. 7A-B above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

An I/O interface 62 is provided for communicating with external and/or internal entities.

A transceiver 61 comprises suitable analogue and digital components to allow signal transmission and signal reception with a wireless device using one or more antennas 63.

Other components are omitted in order not to obscure the concepts presented herein.

FIG. 9 is a schematic diagram showing functional modules of the transmitter network entity 5 of FIGS. 3A and 3B according to one embodiment. The modules are implemented using software instructions such as a computer program. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A modulator 70 corresponds to step 40. A scheme signaller corresponds to step 42.

FIG. 10 is a schematic diagram showing functional modules of the receiver network entity 6 of FIGS. 3A and 3B according to one embodiment. The modules are implemented using software instructions such as a computer program. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 7A and 7B.

A modulation scheme determiner 80 corresponds to step 50. A demodulator 82 corresponds to step 52. A constellation point determiner 82a corresponds to step 52a. A constellation point matcher 82b corresponds to step 52b. A distinguisher 82c corresponds to step 52c.

FIG. 11 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 8. While the computer program 91 is here schematically shown as a track on the depicted optical disk, the computer program can be stored in any way which is suitable for the computer program product, such as a removable solid state memory, e.g. a Universal Serial Bus (USB) drive.

Figure 12:
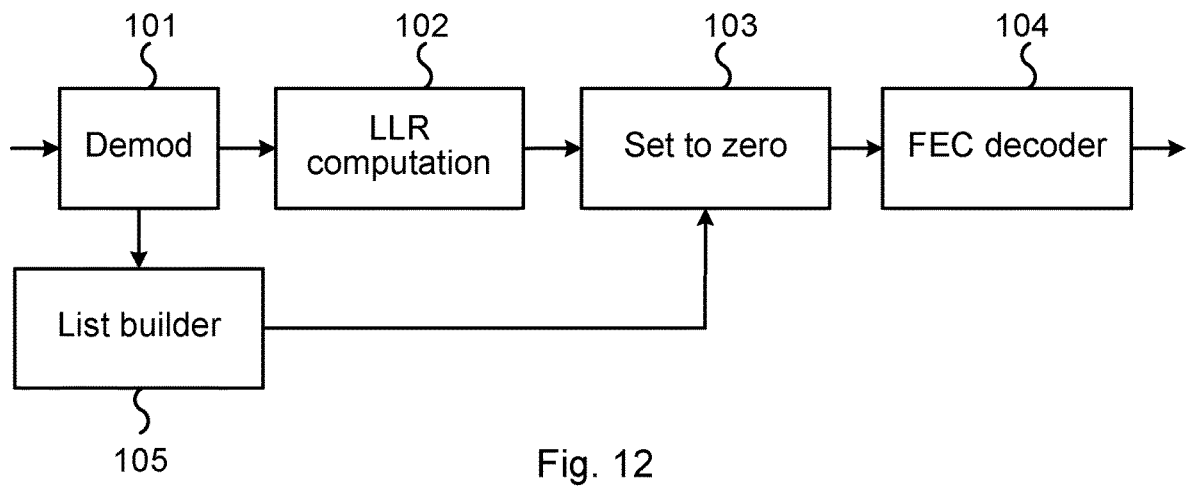
FIG. 12 is a schematic diagram illustrating a receiver network entity used in a set zero mode.
Figure 15:
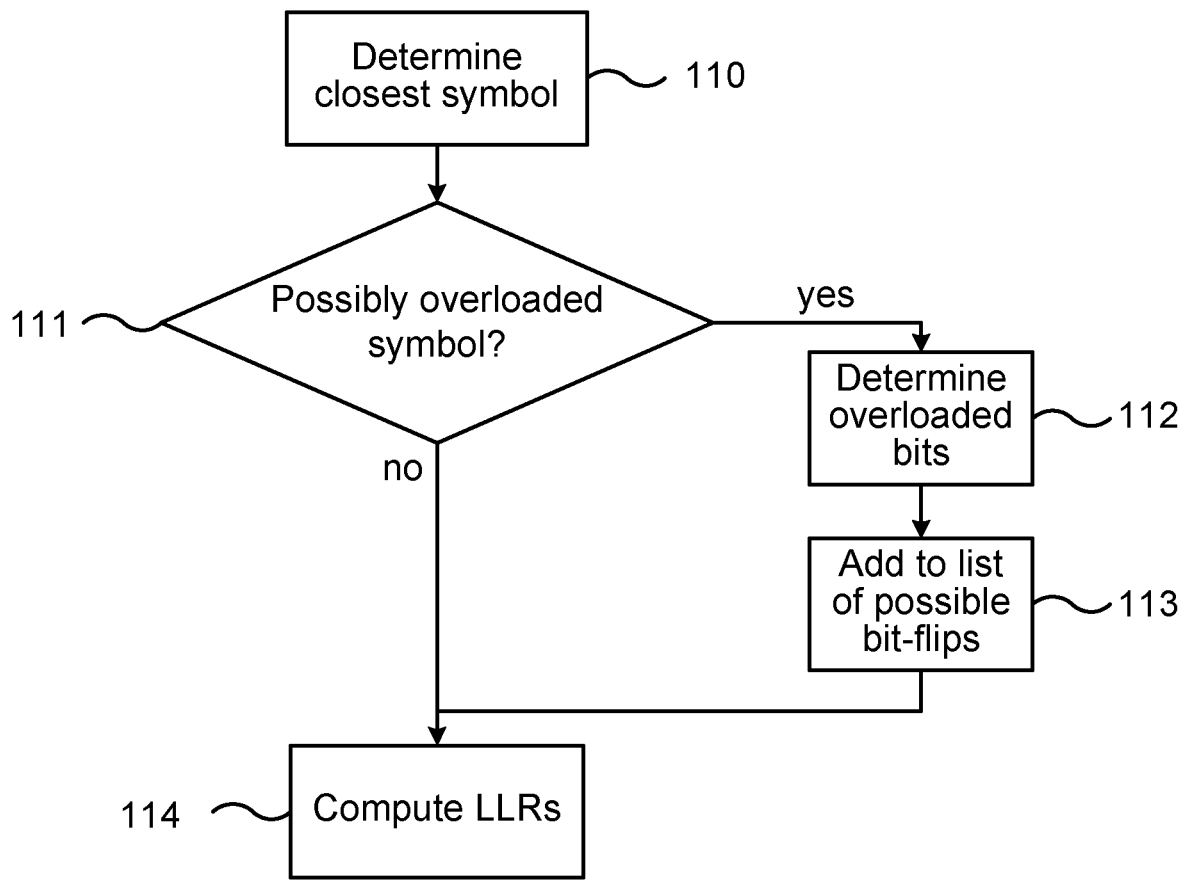
FIG. 15 is a flow chart illustrating a method for shows the common operations performed by the receiver network entities shown in FIGS. 12 and 13.
Figure 16:
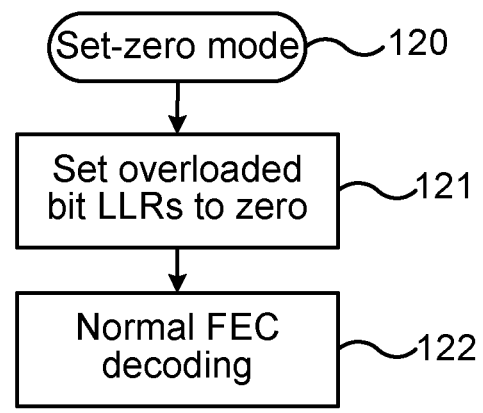
FIG. 16 is a flow chart illustrating a method of operations specific to the set zero mode.

FIG. 12 is a schematic diagram illustrating a receiver network entity used in a set zero mode. The operations are shown in FIGS. 15 and 16 and are described below. This can be applied for the methods illustrated by FIGS. 7A-B, described above.

A received signal is received by a demodulator 101. The demodulator 101 finds a constellation point corresponding to the received signal. When the constellation point is part of the second set (i.e. represents more than one bit sequence), the demodulator provides this information to a list builder 105, which keeps information about when second set constellation points are received. A Log Likelihood Ratio (LLR) module 102 calculates LLRs. A set to zero module 103 sets the received LLR of each ambiguous bit (of a second set constellation point) to zero, effectively introducing an erasure at that bit position. An FEC decoder 104 then performs decoding using FEC of the resulting signal. In this way, FEC is used to fill in the thus erased information.

Figure 13:
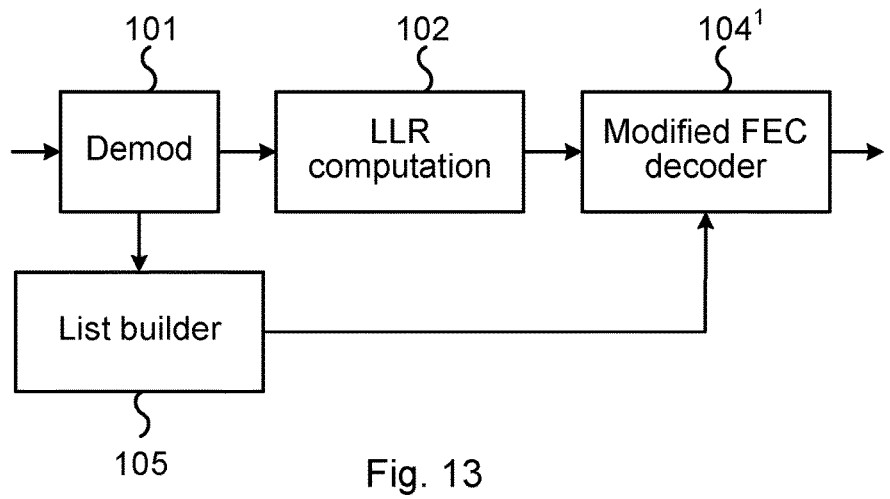
FIG. 13 is a schematic diagram illustrating the receiver network entity used in the flip one and flip all modes.
Figure 17:
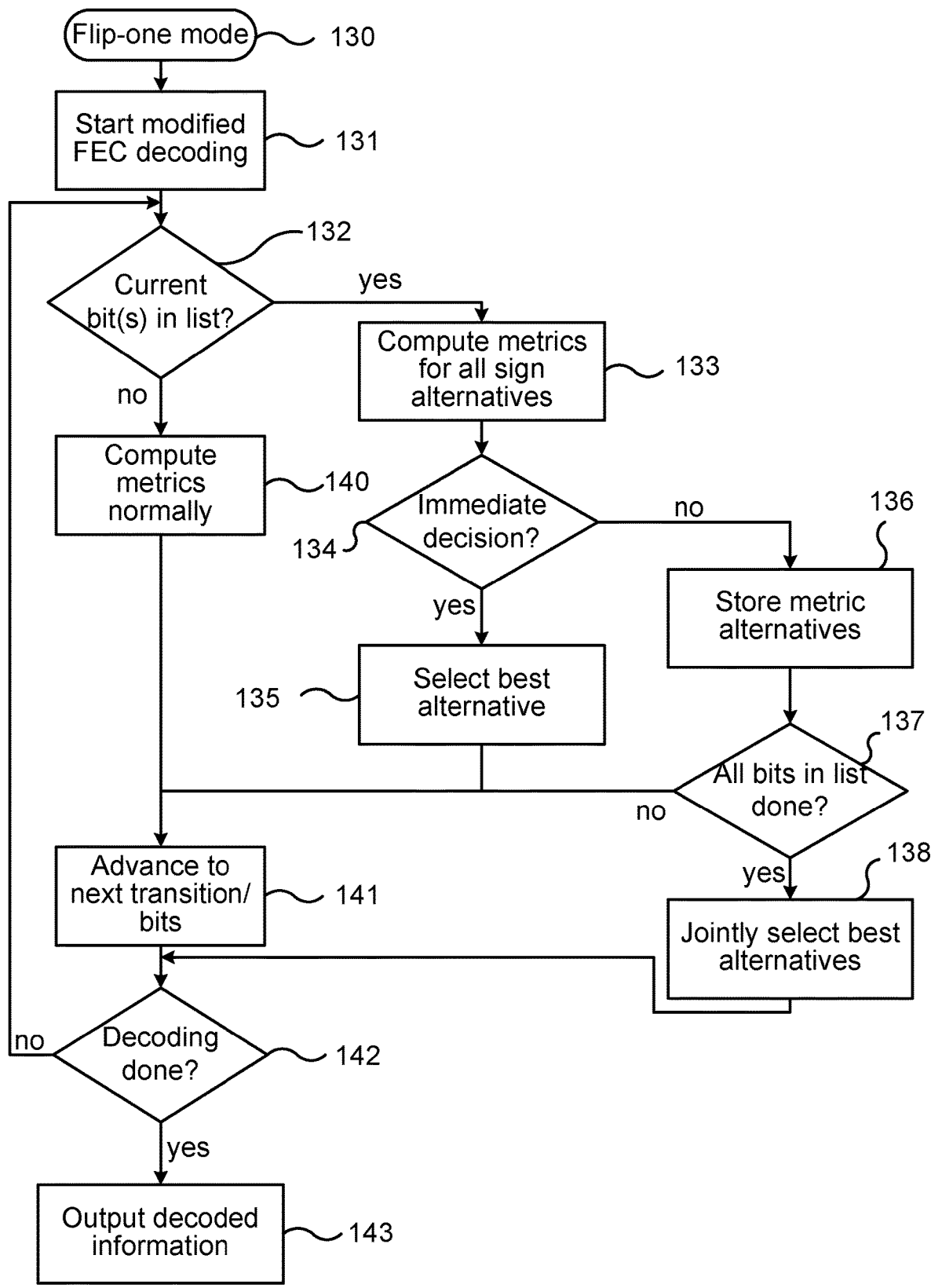
FIG. 17 is a flow chart illustrating a method illustrating operations specific to the flip one mode.
Figure 18:
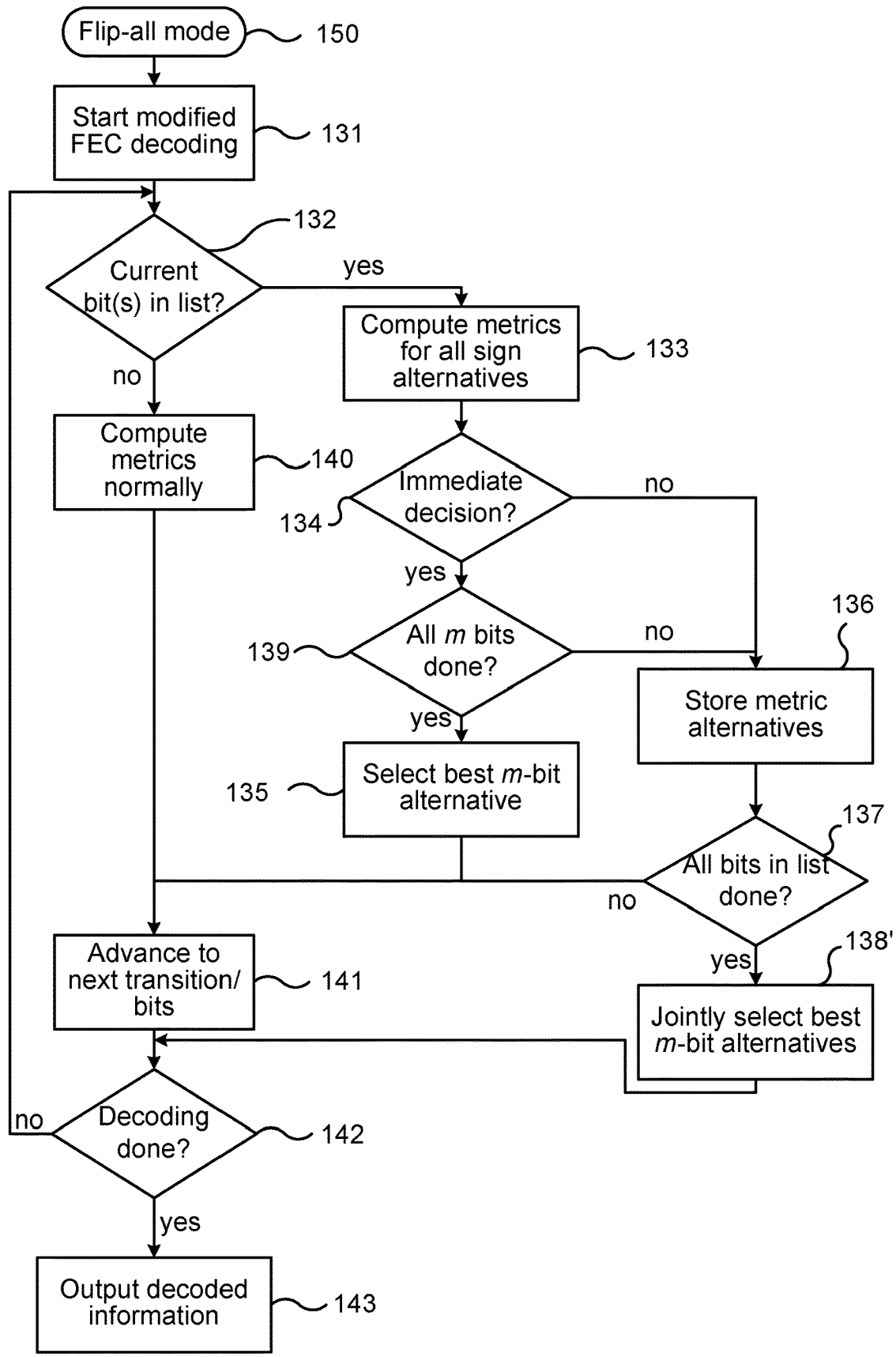
FIG. 18 is a flow chart illustrating a method illustrating operations specific to the flip all mode.

FIG. 13 is a schematic diagram illustrating the receiver network entity used in the flip one and flip all modes. The demodulator 101, list builder 105 and LLR computation 102 are the same as for the set zero mode. The FEC decoder 104' is here modified compared to FEC decoder of FIG. 12. Operations of the decoding are illustrated in FIGS. 17 and 18 and are described below.

Figure 14A:
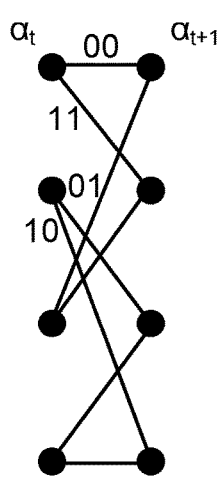
FIGS. 14A-C are schematic diagrams illustrating an example of multiple paths during FEC decoding.
Figure 14B:
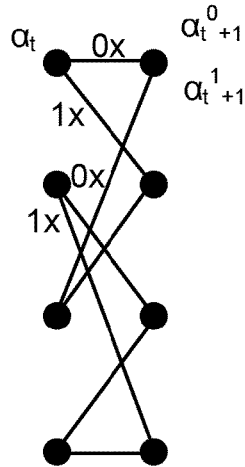
Figure 14C:
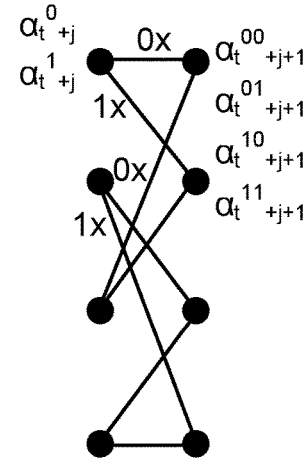

FIGS. 14A-C are schematic diagrams illustrating an example of multiple paths during FEC decoding. The example shows the forward pass of a BCJR (Bahl Cocke Jelinek Raviv algorithm) decoder used in decoding of turbo codes. However, embodiments presented herein also cover similar path/message splitting for other classes of codes and other decoding algorithms, e.g., message passing for LDPC (Low-Density Parity-Check) codes.

The BCJR algorithm computes the bit-wise a posteriori probabilities based on the underlying code trellis:
Compute forward probabilities a
Compute backward probabilities 13
Compute bit-wise probabilities based on $\alpha$, $\beta$ and other information (e.g., noise variance for AWGN (Additive White Gaussian Noise), bit crossover probability for binary symmetric channel)

For each trellis step, at is a vector of probabilities of the trellis state before the transition. During the forward pass of the BCJR algorithm, these vectors are computed and stored. They are then used during the backward pass to compute both $\beta$ and the bit-wise probability (usually in the same backward pass to minimize storage requirements).

FIG. 14A shows the forward BCJR pass of a normal trellis transition where no bits in the bit sequence are overloaded. The Forward state metrics a are computed unambiguously.

FIG. 14B shows a trellis transition where one of the bits in the bit sequence is overloaded (marked with an "x"). As a result, two sets of forward metrics a are computed, one for the metrics if the overloaded bit is a 0, and one for a bit value 1. In case immediate decisions are taken in the flip one mode, the decoder can select which set to retain in the continued computations. In the flip all mode, it is not possible to take a decision until all m bits in the bit sequence have been encountered. m is the number of bits represented by each constellation point, i.e. the number of bits in the bit sequence. Hence, even in the immediate decision alternative, we need to keep track of multiple decoding paths.

FIG. 14C shows how each time we encounter an overloaded bit, the number of paths to follow is doubled (except for the case of immediate decisions in flip one mode).

FIG. 15 is a flow chart illustrating a method for shows the common operations performed by the receiver network entities shown in FIGS. 12 and 13.

The demodulator receives the signal from the RF (radio frequency) chain after down-conversion. The demodulator determines 110 the constellation symbol closest to the received symbol and passes this to the list builder.

The list builder determines 111 if the present symbol is one of the overloaded symbols, i.e. of a constellation point in the second set. If this is the case, the list builder then determined 112 which bit(s) is(are) potentially flipped and adds 113 one or more indices, respectively, for each flipped bit, to a list of possible bit flips.

The bit-wise LLRs are then computed 114.

FIG. 16 is a flow chart illustrating a method of operations specific to the set zero mode.

In the set zero mode 120, all LLRs corresponding to overloaded bits are set 121 to zero. I.e., the LLRs of all bits indicated by the list of possible bit flips are set to zero.

Normal FEC decoding is then performed 122. The FEC fills in the erasures created by overloading the bits, where LLRs was set to zero.

FIG. 17 is a flow chart illustrating a method illustrating operations specific to the flip one mode 130.

In the flip one mode, the LLRs and the list of possible bit flips are sent to the modified FEC decoder, where a modified FEC decoding is started 131. It is then determined 132 whether the current bit(s) to be decoded are in the list of possibly flipped bits. If this is not the case, metrics are computed normally 140. On the other hand, when a possibly flipped bit is encountered, the decoding metrics for both the original sign of the LLR are and the opposite sign of the LLR are computed 133, see FIGS. 14A-C and corresponding description above.

At this point, it is decided 134 whether to take an immediate decision or not. It is possible to either take immediate decisions on the sign of the LLRs or wait until all potentially flipped bits have been encountered in the decoding process.

In the case of immediate decisions, the decoder selects 135 the sign of the LLR that minimizes the decoding metric, i.e. the best alternative. The sign corresponds to the value of the bit.

If delayed decisions are used, then the FEC decoder stores 136 the decoding metrics associated with both sign alternatives, thus continuing with two decoding paths. In general, the number of possible alternatives increased with a power of two, since for every bit in the list of possible bit flips, the number of decoding paths double.

To reduce the storage requirement and complexity, the set of paths can optionally be continuously pruned. Methods to prune the paths include, but are not limited to

- Discarding the paths with the worst decoding metrics based on some threshold of the metric
- Retaining a fixed number of best paths
- When the set of paths become full, take a decision on the best bit(s) in the list of possible bit flips, and retaining the paths corresponding to that decision.

Here the term path should be interpreted as decoding alternatives in a wide sense, not limited to the path in e.g., the Viterbi Algorithm/Maximum Likelihood Sequence Estimator. In case of message passing decoders, multiple paths would be multiple messages corresponding to alternative signs of bit(s) in the list of possible bit flips.

After the bit is processed, it is determined 137 whether all bits have been processed. If all bits have not been processed, the next bit is selected 141.

If all bits have been processed, the path with the best decoding metric is selected 138 as FEC output. This selection may be done in either a direct manner taking decision on all alternatives at once. Alternatively, this can be done in a successive or iterative manner, where a decision is first taken on one or some bits, the decoding metrics are then recalculated with these decisions taken, and then decisions are taken on the next bit(s). This is successively progressed until all overloaded bits have been resolved.

Optionally, the magnitude of the LLRs of potentially flipped bits can be reduced to indicate the lower reliability of the potentially flipped bits.

It is then determined 142 whether decoding is done. If decoding is not done, the next bit is processed by returning to step 132. Otherwise, the decoded information is output 143 for further processing.

FIG. 18 is a flow chart illustrating a method illustrating operations specific to the flip all mode. Many of the steps are the same as for the flip one mode, illustrated in FIG. 17, and are not described again. In the flip all mode 150, the LLRs and the list of possible bit flips are sent to a modified FEC decoder.

When a possibly flipped bit is encountered, this will be one of m bits that are all jointly flipped or not, since the entire bit sequence is flipped. Hence, it is here introduced a decision step for determining 139 when all m bits in the bit sequence are done. Instead of computing the decoding metrics for the two options, for the original LLR sign or for the opposite LLR sign (corresponding to un-flipped and flipped bits, respectively), for a single bit, this is done for m bits jointly.

The remaining steps of the processes are similar to the flip one procedure. However, when decisions on LLR signs are taken, they are always taken 138' for a group of m bits at a time, since all the bits in the m-bit long bit sequence are flipped jointly, when flipped.

The flip all operation requires more house-keeping to track the bits and flipping alternatives, but since now m bits instead of one bit is flipped, the difference in decoding metric between the alternatives is larger, whereby the recovery of the information is more reliable.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for modulating data for transmission over a communication channel to a receiver network entity, the method being performed in a transmitter network entity and comprising the step of:
   - modulating data in accordance with a modulation scheme, the modulation scheme comprising a first set of constellation points respectively representing only one bit sequence and a second set of constellation points respectively representing two different bit sequences;
   - wherein each constellation point in the first set represents the same bit sequence as for a corresponding constellation point of a square Quadrature Amplitude Modulation (QAM) scheme,
   - wherein for each constellation point in the second set, a first bit sequence is the same bit sequence as for the corresponding square QAM scheme and a second bit sequence represents a constellation point of the square QAM scheme which is not present in the modulation scheme, and
   - wherein, for each constellation point in the second set, the first bit sequence is the inverse of the second bit sequence.

2. A transmitter network entity for modulating data for transmission over a communication channel to a receiver network entity, the transmitter network entity comprising:
   - a processor; and
   - a memory storing instructions that, when executed by the processor, cause the transmitter network entity to:

modulate data in accordance with a modulation scheme, the modulation scheme comprising a first set of constellation points respectively representing only one bit sequence and a second set of constellation points respectively representing two different bit sequences;

wherein each constellation point in the first set represents the same bit sequence as for a corresponding constellation point of a square Quadrature Amplitude Modulation (QAM) scheme, wherein for each constellation point in the second set, a first bit sequence is the same bit sequence as for the corresponding square QAM scheme and a second bit sequence represents a constellation point of the square QAM scheme which is not present in the modulation scheme, and wherein, for each constellation point in the second set, the first bit sequence is the inverse of the second bit sequence.

3. The transmitter network entity according to claim 2, wherein when all of the constellation points of the modulation scheme are plotted on a constellation diagram, the constellation points resemble a rectangle with removed corners.

4. The transmitter network entity according to claim 3, wherein there is one corner point missing for each corner, in the constellation diagram, to make complete rectangle.

5. The transmitter network entity according to claim 3, wherein there are three corner points missing for each corner, in the constellation diagram, to make complete rectangle.

6. The transmitter network entity according to claim 2, further comprising instructions that, when executed by the processor, cause the transmitter network entity to signal to the receiver network entity the modulation scheme being used.

7. The transmitter network entity according to claim 2, further comprising instructions that, when executed by the processor, cause the transmitter network entity to determine the modulation scheme to be used, which comprises to receive a signal indicating the modulation scheme to use.

8. The transmitter network entity according to claim 2, wherein the transmission is an uplink transmission.

9. A method for demodulating signals received over a communication channel from a transmitter network entity, the method being performed in a receiver network entity and comprising the steps of:

determining a modulation scheme used by the transmitter network entity, wherein the modulation scheme comprises a first set of constellation points respectively representing only one bit sequence and a second set of constellation points respectively representing two different bit sequences; and demodulating received signals in accordance with the modulation scheme, wherein the step of demodulating received signals comprises the steps of:
determining the constellation points in the second set;
determining when a received symbol is considered to match a constellation point in the second set, yielding an ambiguous symbol; and
distinguishing between the multiple bit sequences of an ambiguous symbol using forward error correction (FEC).

10. The method according to claim 9, wherein the step of determining a modulation scheme comprises receiving a signal indicating the modulation scheme being used.

11. The method according to claim 9, wherein the signals are received in an uplink reception.

12. A receiver network entity for demodulating signals received over a communication channel from a transmitter network entity, the receiver network entity comprising:
a processor; and
a memory storing instructions that, when executed by the processor, cause the receiver network entity to:
determine a modulation scheme used by the transmitter network entity, wherein the modulation scheme comprises a first set of constellation points respectively representing only one bit sequence and a second set of constellation points respectively representing two different bit sequences; and
demodulate received signals in accordance with the modulation scheme, wherein the instructions to demodulate received signals comprise instructions that, when executed by the processor, cause the receiver network entity to:
determine the constellation points in the second set;
determine when a received symbol is considered to match a constellation point in the second set, yielding an ambiguous symbol; and
distinguish between the multiple bit sequences of an ambiguous symbol using forward error correction (FEC).

13. The receiver network entity according to claim 12, wherein the instructions to determine a modulation scheme comprise instructions that, when executed by the processor, cause the receiver network entity to receive a signal indicating the modulation scheme being used.

14. The receiver network entity according to claim 12, wherein the signals are received in an uplink reception.

* * * * *